Figure 1:
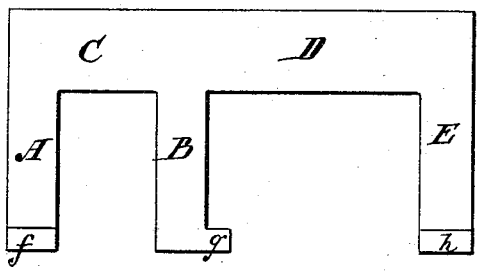

J. M. SEYMOUR.
BUCKLES FOR COTTON-BALE TIES.

No. 179,872. Patented July 18, 1876.

Witnesses:
Robt. H. Duncan
Thos. P. How

Inventor:
Jas. M. Seymour

UNITED STATES PATENT OFFICE.

JAMES M. SEYMOUR, OF NEWARK, NEW JERSEY.

IMPROVEMENT IN BUCKLES FOR COTTON-BALE TIES.

Specification forming part of Letters Patent No. 179,872, dated July 18, 1876; application filed June 15, 1875.

*To all whom it may concern:*

Be it known that I, JAMES M. SEYMOUR, of the city of Newark, county of Essex, and State of New Jersey, have invented a new and useful Improvement in Buckles for Cotton-Bales and other Packages, of which the following is a specification:

This invention relates to a buckle especially adapted by its construction to take up the slack of the band or hoop—*i. e.*, to draw the band tightly around the bale or package, and, when the band is thus tightened, to firmly hold the slack and the ends of the band.

The mode or process by which the slack of the band is taken up and secured constitutes the subject-matter of another application of even date herewith, entitled "improvement in the art of baling cotton, hay, and other materials," and is fully described and claimed therein.

The present invention consists of a buckle provided with two straining-bars, adapted to be embraced by the ends of the band, an arm extended at right angles to the straining-bars, which acts as a lever to turn the buckle over endwise, and a bar projecting laterally from the lever-arm in the direction of the straining-bars, which, by being slipped under the tightened band, securely fastens the ends of the band and retains the buckle in its place.

In baling cotton, hay, and other elastic materials for storage or shipment, it is of great importance to confine them in the narrowest compass at the least expenditure of power. The difficulty experienced heretofore, when these materials have been baled under pressure, and fastened with metallic bands, has been that the bands, by reason of the rigidity of the metal of which they are made, could not be readily, and without the aid of mechanical devices other than the fastening-buckle, drawn tightly around the bale. The slack of the bands has been suffered to remain till the bale was released from pressure, and has then been taken up by the expansion of the pressed material of which the bale was composed. It followed that the bale assumed a much larger compass than would have been the case had the slack been completely taken up, and the bands securely fastened, before the bale was released from the press; also, that a portion of the power expended to reduce the bale in the press has been absolutely lost by the expansion permitted by the looseness of the bands.

The object of the buckle to which this invention relates is to provide a mechanical device, by means of which the slack of the bands can be perfectly taken up while the bale is under pressure, and at the same time furnish a secure and reliable fastening for the ends of the band, so that it cannot slip when the pressure is removed.

Figure 2:
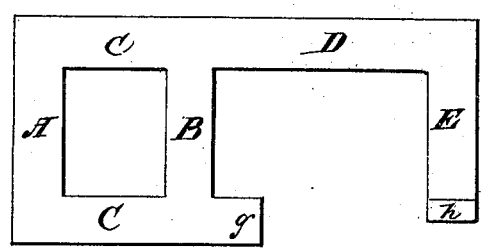
Figure 3:
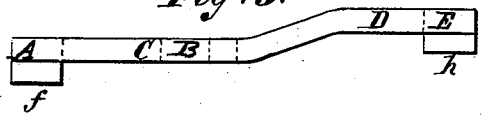
Figure 4:
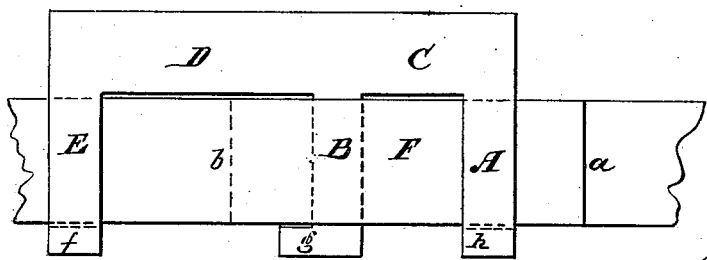
Figure 5:
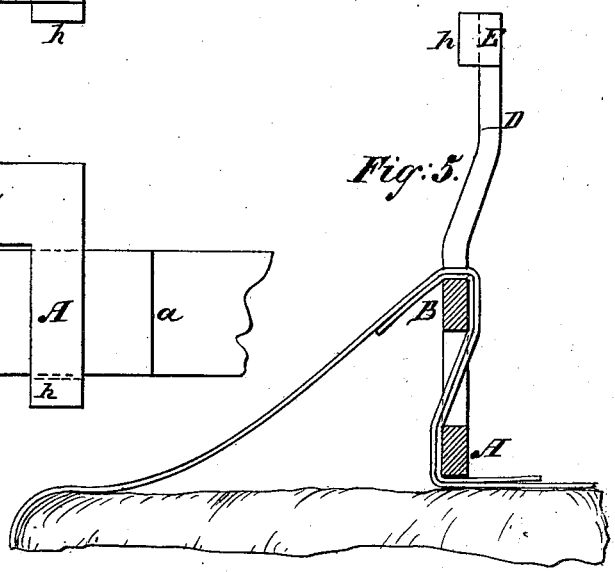
Figure 6:
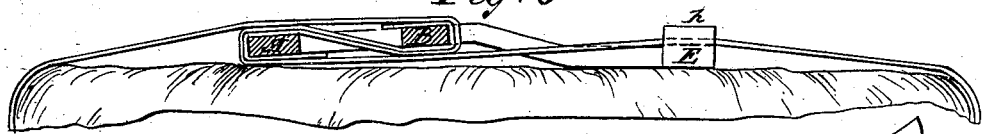
Figure 7:
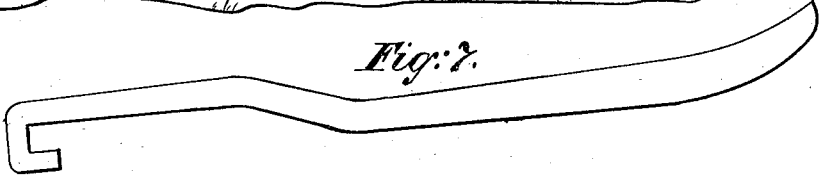

The invention is illustrated in the accompanying drawing, in which Figure 1 is a plan view of the buckle, in which the straining-bars are disconnected at one of their ends, thus permitting the buckle to be passed sidewise over and under the lapped ends of the band. Fig. 2 is a plan view of a buckle in which the straining-bars are connected at both their ends. Fig. 3 is a side view of the buckle, showing the downward bend of the lever-arm, to facilitate its introduction beneath the band and the projections on the straining and fastening bar. Fig. 4 is a plan view of the buckle as shown in Fig. 1, and the ends of the band, showing the method of interlocking the buckle and the ends of the band before the operation of taking up the slack is commenced. Fig. 5 is a sectional view of the buckle and the band, showing the position of the two while the band is being strained—*i. e.*, the slack is being taken up. Fig. 6 is a sectional view of the same when the band has been drawn tightly around the bale and the fastening completed. Fig. 7 is a form of a lever which may be used to turn the buckle over endwise.

In the drawing, like letters designate like parts in all the figures in which they appear.

A and B represent the straining-bars; C C, the sides of the buckle; D, the lever-arm; E, the fastening-bar; F, the lap of the band; $f, g$, and $h$, projections on the ends of the bars, to keep the band in position; $a$ and $b$, the ends of the band.

The buckle may be made of such size and strength as in practice shall be found necessary, and may be cast or struck from metal by means of dies, or made of any other suitable material.

The straining-bars A and B may be placed at such distance apart as in use shall be found desirable.

When the band is of rigid metal there will naturally be a large amount of slack to be taken up, and this can be perfectly accomplished by placing the straining-bars at a sufficient distance apart, inasmuch as the buckle will take up an amount of slack equal to twice the distance by which the outside of the straining-bars are separated from each other.

To apply the buckle with the open straining-bars, (shown in Fig. 1,) the band is passed around the bale, and the ends lapped over upon each other. The buckle is then interlocked with the lapped ends of the band, so that the straining-bar A will rest outside the lap. The bar B will lie underneath the same, and the fastening-bar E will rest on the same side of the band as the bar A. This position of the band and buckle is shown in Fig. 4 of the drawing.

The buckle, when thus interlocked with the lap of the band, is seized by the lever-arm D, either with the hand, or with some suitable instrument, and turned or tilted over endwise in the direction of the bar A, the buckle resting upon the bar A as a center during the first part of the turn.

Fig. 5 shows the position of the band and buckle when the buckle has been turned halfway over, from a position parallel with the surface of the bale to a position perpendicular with such surface.

The ends of the band will be folded over the edges of the straining-bars, and, being pressed down by the overlying band, will be prevented from slipping. As the buckle is still further turned over from its perpendicular position by bringing the lever-arm down toward the surface of the bale, the straining-bar A will naturally recede along the surface of the bale, and take nearly the position which the bar B occupied when the operation commenced.

The effect of this exchange of the positions of the two straining-bars is, that the band is at the same moment strained equally from both sides of the buckle.

When the lever-arm has been forced down upon the surface of the bale—*i. e.*, when the buckle has been completely turned over—the slack of the band will have been taken up and disposed of in a double fold, extending from the outside edges of the two straining-bars.

The buckle is secured in its final position by swinging the lever-arm laterally away from the band as the lever-arm is being brought down from the perpendicular position toward the surface of the bale, till the fastening-bar is outside of the line of the band, when the fastening-bar is forced underneath the band, and thus retained in place.

When the buckle with the straining-bars connected at both ends (shown in Fig. 2) is used, the ends of the band must be thrust through the opening between the bars, and the bars interlocked with the ends of the band, as shown in Fig. 4, when the operation will be the same as heretofore described.

The advantage of the buckle with the closed straining-bars is, that greater strength can be given to the device by the use of the same quantity of metal in its construction. In practice, however, it may be found more difficult of manipulation than the open buckle, inasmuch as the ends of the band must be inserted endwise, while the open buckle can readily be slipped sidewise over the lap of the band, and be in the proper position to make the turn.

The downward bend in the lever-arm, while it facilitates the introduction of the fastening-bar underneath the band, by bringing it in closer contact with the surface of the bale, may be omitted, and the lever-arm extended on a straight line with the frame, which joins the straining-bars.

Any other device or method of securing the buckle in place after the slack has been taken up other than that described—*i. e.*, of forcing the fastening-bar underneath the band—may be employed, and in such case the fastening-bar may be omitted.

It is not designed to limit the use of this buckle to confining elastic materials in bales or packages by means of metallic bands or hoops. It will be found to be an efficient and reliable device to be used in connection with any kind of flexible bands of metal, rope, leather, &c., and whether the material to be baled is elastic or non-elastic in its nature.

This buckle can be used advantageously to take up the slack of bands and hoops which have been fastened around bales and packages by other devices, and become loosened by handling or otherwise. In such cases the buckle may be applied to any part of the body of the band, and operated as already described.

What is claimed as new is—

1. A buckle provided with two straining-bars, a lever-arm, and a fastening-bar, constructed and arranged to operate substantially as and for the purpose described.

2. A buckle provided with two straining-bars and a lever-arm, constructed and arranged to operate substantially as and for the purpose set forth.

3. A buckle provided with two straining-bars and a lever-arm, when one or both of the straining-bars are provided with projections to retain the band in position upon the bar or bars, substantially as set forth.

JAS. M. SEYMOUR.

Witnesses:
 THOS. P. HOW,
 ROBT. H. DUNCAN.